No. 890,601. PATENTED JUNE 16, 1908.
J. G. CALLAN.
WINDING MACHINE.
APPLICATION FILED JAN. 19, 1905.

Witnesses:

Inventor,
John G. Callan,
By Atty.

No. 890,601. PATENTED JUNE 16, 1908.
J. G. CALLAN.
WINDING MACHINE.
APPLICATION FILED JAN. 19, 1905.

Witnesses:

Inventor,
John G. Callan,
By Albert H. Davis
Atty.

No. 890,601.

J. G. CALLAN.
WINDING MACHINE.
APPLICATION FILED JAN. 19, 1905.

PATENTED JUNE 16, 1908.

Witnesses

Inventor,
John G. Callan
By Att'y.

No. 890,601. PATENTED JUNE 16, 1908.
J. G. CALLAN.
WINDING MACHINE.
APPLICATION FILED JAN. 19, 1905.

Witnesses:

Inventor
John G. Callan
By
Att'y.

No. 890,601. PATENTED JUNE 16, 1908.
J. G. CALLAN.
WINDING MACHINE.
APPLICATION FILED JAN. 19, 1905.

Witnesses:

Inventor
John G. Callan.
By 
Att'y.

No. 890,601.

J. G. CALLAN.
WINDING MACHINE.
APPLICATION FILED JAN. 19, 1905.

PATENTED JUNE 16, 1908.

Witnesses:
George A. Thornton
Allen Oxford

Inventor
John G. Callan.
By Albert H. Davis
Att'y

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

WINDING-MACHINE.

No. 890,601.  Specification of Letters Patent.  Patented June 16, 1908.

Application filed January 19, 1905. Serial No. 241,788.

*To all whom it may concern:*

Be it known that I, JOHN G. CALLAN, a citizen of the United States, residing at Lynn, county of Essex, State of Massachusetts, have invented certain new and useful Improvements in Winding-Machines, of which the following is a specification.

This invention relates to winding machines and particularly to a machine for winding coils of flexible conductor for use in electrical apparatus.

The machine is useful in winding resistance coils, electromagnet coils, the coils used in electrical measuring instruments and the like, but is particularly designed with adjustable parts, many of them operated automatically, to adapt the machine for forming more complicated structures such, for instance, as the small armatures used in electric meters of the motor type. These armatures consist of a plurality of coils each consisting of a definite number of convolutions of very small insulated wire similarly disposed about a light form of wood, paper, non-magnetic sheet-metal, or of fusible material which is afterwards melted out.

The object of my invention is to provide a winding machine which may be adjusted to wind articles varying widely in construction and in which many of the necessary operations are performed automatically so that the output per operator is greatly increased and the finished products are more uniform.

Though particularly designed for winding coils of wire for use in electrical apparatus it will be readily understood that the invention is in no way limited to such uses.

The novel features of my invention will be definitely indicated in the claims appended hereto; the details of construction and the mode of operation of my improved winding machine will be better understood by reference to the following description taken in connection with the accompanying drawings which show one embodiment of my invention.

In the drawings, Figures 1 and 1^A show a front view of the machine, Fig. 1^A showing in full lines portions of the machine above those shown in Fig. 1 and in dotted lines parts which are hidden by the parts shown in Fig. 1.

Referring to the drawings, 1 indicates a table on which the machine is mounted, and 2 the drive shaft of the machine to which rotary motion is communicated by a belt from any suitable source of power or by an electric motor supported beneath the table with its shaft in a vertical position and coupled directly to shaft 2. Near the upper end of the shaft 2 is a friction roller 3 which engages a friction roller 4 on a shaft 5 which carries at its opposite end friction rollers 6 and 21, Fig. 5.

Figure 1:
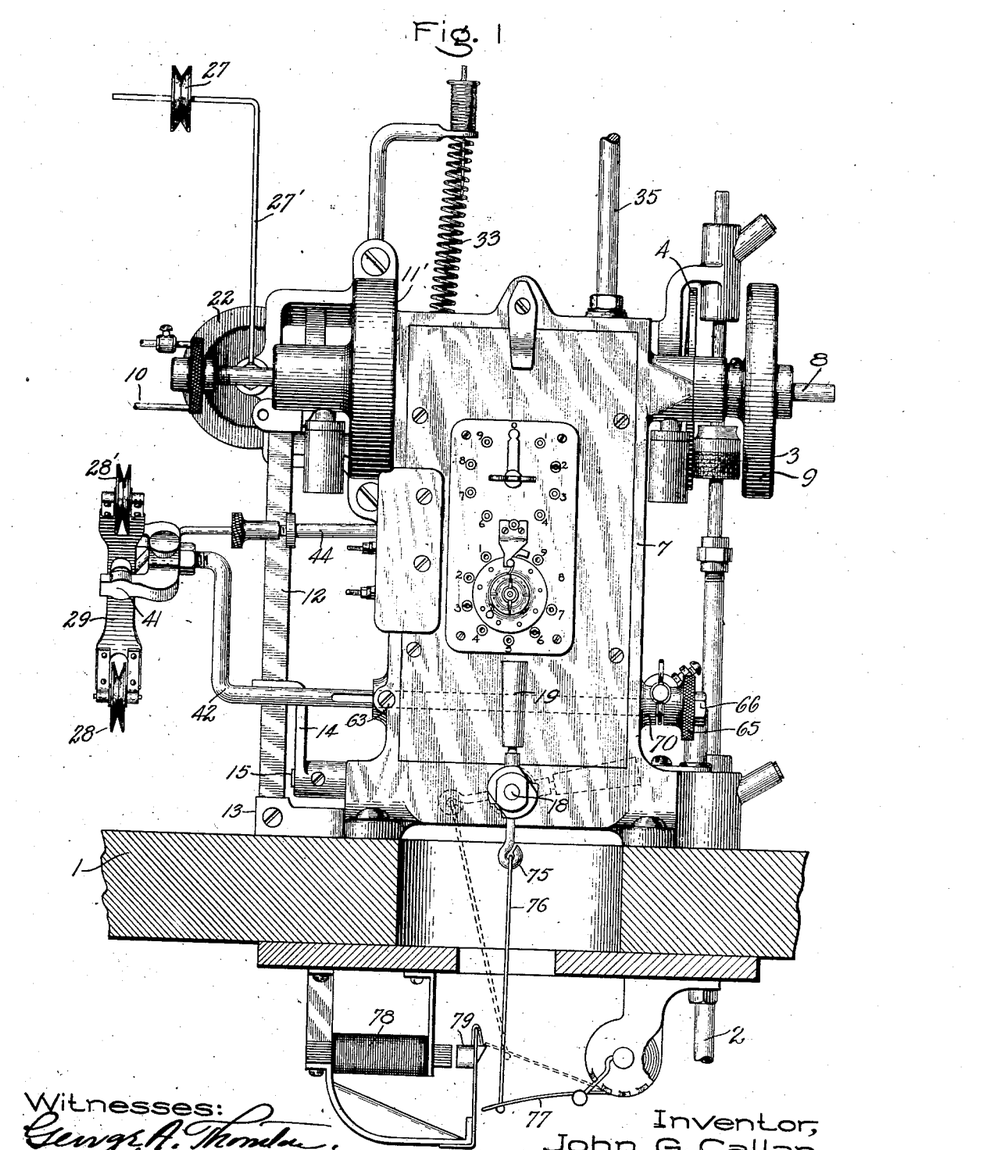

Mounted in suitable bearings in the frame 7 of the machine parallel to shaft 5 is a shaft 8, on one end of which is a fly-wheel 9; on the other end of shaft 8 is a supporting member or holder to support the material during the winding operation or to hold a form or armature frame on which a plurality of coils are to be wound. The particular design of this holder may vary widely with the different articles which are to be wound; for some purposes I prefer to use a fork as shown in Fig. 1. Mounted on shaft 8 is a friction roller 11 inclosed by a casing 11', which is adapted to be engaged by the roller 6 to communicate rotary motion from shaft 5 to shaft 8.

Figure 2:
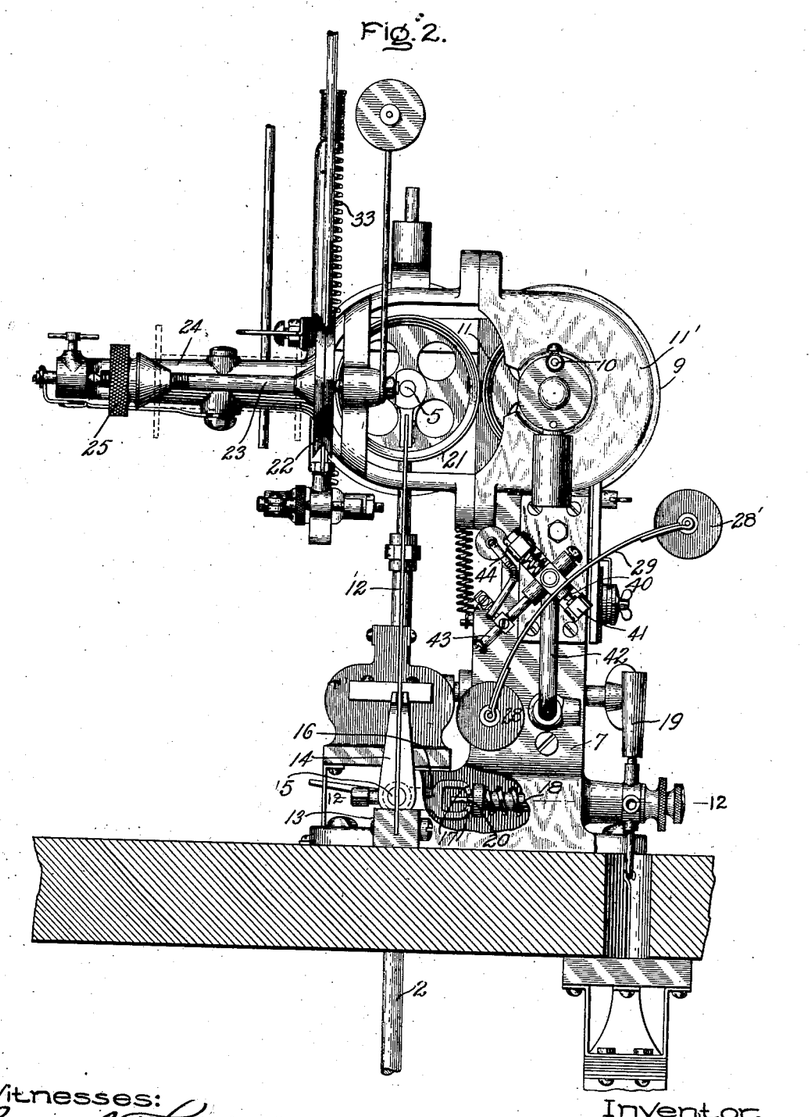
Fig. 2 is a side elevation of the portion of the machine shown in Fig. 1, broken away in part.

In order to move the friction roller 6 into and out of engagement with roller 11, the end of shaft 5 is supported by a strip of spring-metal 12 as best shown in Fig. 2, and means are provided for moving the strip and with it the end of shaft 5 and the roller 6 toward and away from roller 11. The lower end of the flexible strip 12 is fastened in a block 13 on the table 1, and an arm 14 carried by a shaft 15 has a forked end which straddles strip 12. Shaft 15 is mounted in suitable bearings and is provided with an arm 16 which extends forward and is provided at its forward end with jaws 17, as best shown in Figs. 2 and 12.

Figure 5:
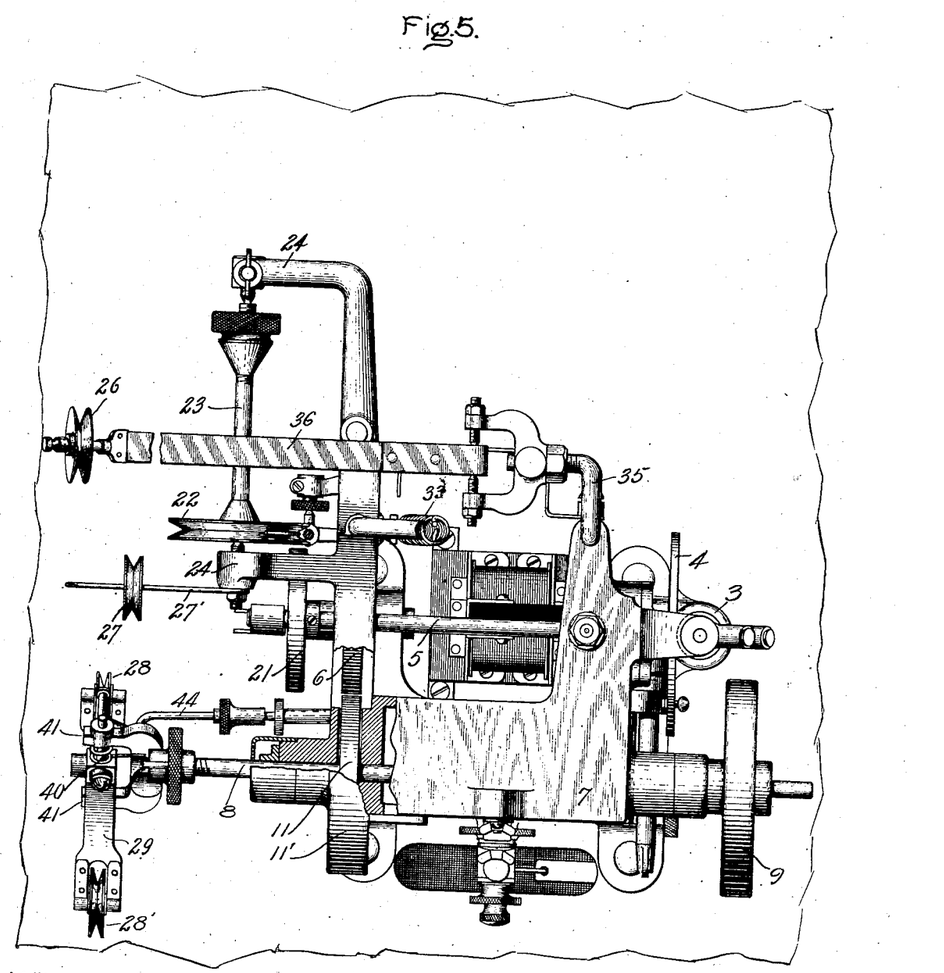
Fig. 5 is a top view, some of the parts being shown in section.
Figure 12:
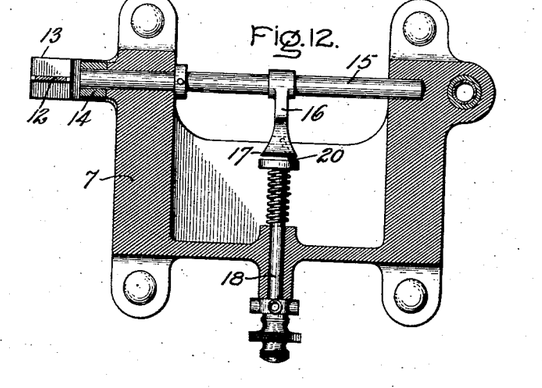
Fig. 12 is a section on line 12 12 of Fig. 2.

Mounted in a bearing in the front of the frame 7 is a shaft 18 provided with a handle 19, and on the inner end of this shaft is a pin 20, Fig. 12, eccentrically disposed and extending between the jaws 17 in the arm 16. Thus by turning handle 19 a quarter revolution in either direction the arm 16 is moved up or down by pin 20, rocking shaft 15 in its bearings and moving the arm 14, the strip 12 and shaft 5 either forward or backward. The forward movement of strip 12 brings roller 6 into engagement with roller 11 and thus drives the supporting member on which the coil is wound. A backward movement of strip 12 carries roller 21 which is keyed on the shaft 5 into engagement with a wheel 22 carried by a shaft 23 (Fig. 5). This latter shaft is supported in bearings in arms 24 on the frame 7 in such a manner as to permit it to be readily removed and carries the reel of wire or other material from which the coil is wound. A thumb-nut 25 is adjustable on shaft 23 and may be screwed up against the reel in order to hold it tight on the shaft and thus cause it to rotate with the wheel 22. When the friction roller 6 is in engagement with roller 11 and thus driving the member 10 to wind on the turns of wire, the roller 21 is out of engagement with the wheel 22 and the shaft 23 rotates freely except for certain braking devices which will be more fully described hereafter; but when the strip 12 is moved backward by arm 14 roller 6 disengages roller 11 and roller 21 engages wheel 22. The shaft 8 and the form carried thereby are thus free to rotate and the wheel 22 and shaft 23 are driven by the friction roller 21 in a direction to wind the wire upon the reel carried by shaft 23; that is, in a direction to draw the wire off from the form carried by the fork 10 on which it had been wound.

Figure 4:
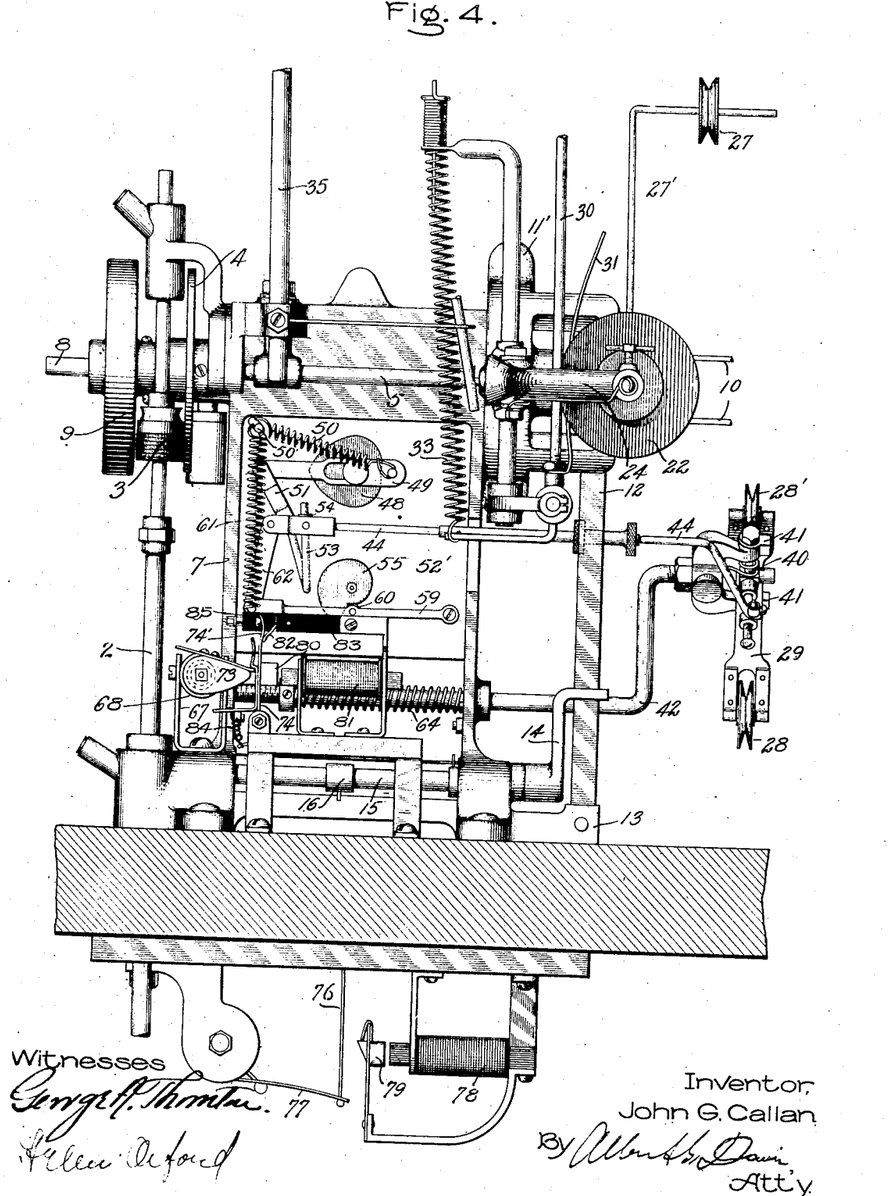
Fig. 4 is a back view.

When the handle 19 is turned one-quarter of a revolution to connect shaft 5 in driving relation to shaft 8 it is held in that position for a definite period of operation. The means for accomplishing this consists of a latch controlled by an electromagnet. On the shaft 18, to which the handle 19 is fastened, is a crank 75 (Fig. 1) which is connected by a link 76 to a stiff spring 77 mounted on the bottom of the table 1. Also secured on the bottom of the table is an electromagnet 78 provided with a spring-retracted armature 79 which is shaped so as to form a latch for the spring 77 as shown in Figs. 1 and 4. Thus when the handle is turned, spring 77 is drawn up until it catches over the edge of the armature 79 and shaft 18 is held by friction in its bearing in this position against the tension of the spring strip 12. When circuit through the coils of magnet 78 is closed as will be hereafter explained, the magnet is energized, armature 79 is attracted and spring 77 released and the latter turns shaft 18 to its normal position in which shaft 5 is disconnected from both shafts 8 and 23.

Figure 1A:
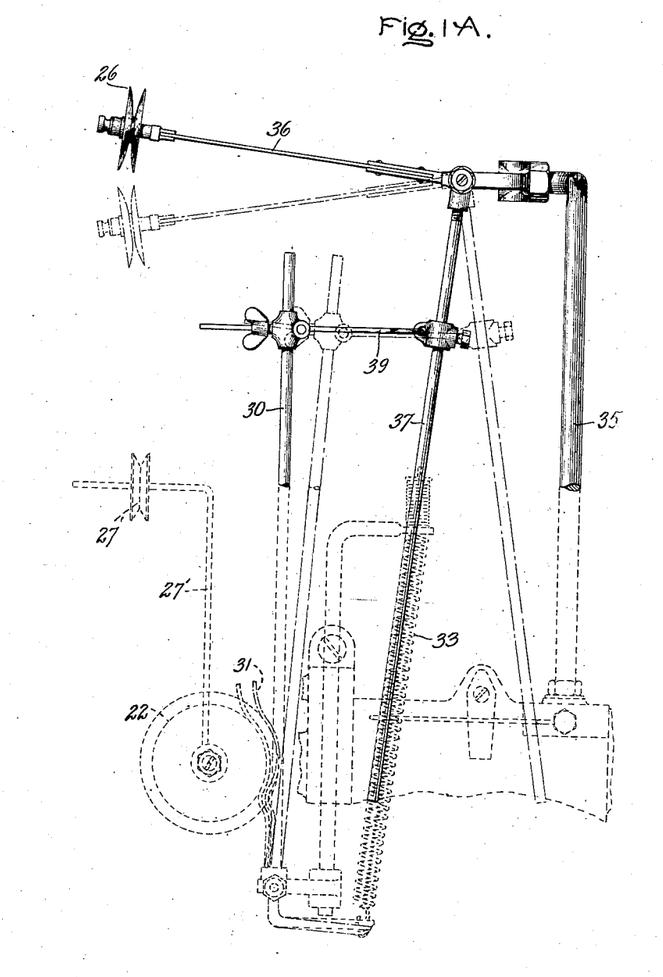

The wire from the reel carried by shaft 23 passes up over a spring-supported roller 26 (Fig. 5), down over a roller 27 carried by a spring-arm 27' supported on the arm 24, then down over two guide-rollers 28 and 28' carried on the ends of a pivotally-supported leaf-spring 29, and then up to the form on fork 10 where it is wound on in the proper relation. It will be seen that the various guide-rollers over which the wire passes are all spring-supported and will therefore yield and tend to equalize the tension of the wire that is wound to form a coil. In order to insure this equality of tension I employ a tension equalizing device responsive to the tension of the wire itself. Any one of a number of forms of tension equalizing devices may be provided for this purpose; in the present instance I have illustrated a simple mechanical device consisting of a brake acting on the shaft 23 or the reel of wire carried thereby and means for varying the effect of this brake as the tension of the wire varies. The wheel 22 on the shaft 23 is provided with a peripheral groove, and below this wheel is pivotally mounted a brake-lever 30 carrying a wire 31 as shown in Fig. 1ᴬ. A spring 33 acts on the brake-lever 30 in a direction to force it and wire 31 forward into the groove on the wheel 22. Rigidly supported on the top of frame 7 and extending upward therefrom, is a standard 35 in the end of which is pivotally mounted a leaf-spring 36 carrying the guide-roller 26. Connected to spring 36 is a downwardly-extending rod 37 which is connected by an adjustable link 39 to the upper end of brake-lever 30. It will thus be seen that as the tension of the wire increases due to the braking effect of lever 30 and wire 31 or to the way the wire is wound on the reel or to any other causes, the roller 26 is drawn down by the wire itself and the spring 36 put under tension; this tends to move rod 37 to the right in Fig. 1ᴬ, and rod 37 carries with it the brake lever 30 and wire 31 against the tension of spring 33 thus decreasing the braking effect on the wheel 22 and allowing the wire to be drawn from the reel more freely. As the tension of the wire decreases, arm 36 straightens out, and spring 33 pulls brake-lever 30 up against wheel 22 to increase its braking effect on the wheel. The tension of the wire is thus automatically regulated and depends upon the wire itself, so that the tension of all the turns wound on the form held by the fork 10 is the same thus making the coils more even and uniform.

Figures 10, 11, 13, 14:
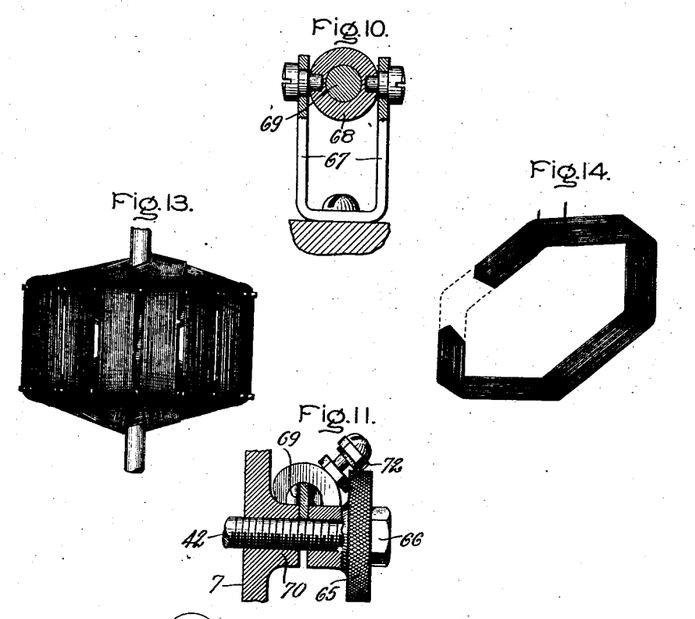
Fig. 10 is a section on line 10 10 of Fig. 3.
Fig. 11 is a section on line 11 11 of Fig. 3.
Fig. 13 is an elevation of a type of armature which may be wound on the machine.
Fig. 14 shows one coil of the armature shown in Fig. 13, broken away in part to show the cross-section of the coil.

As above described the rollers 28 28' are carried on the ends of the leaf-spring 29. This spring is secured on a short shaft 40 pivotally mounted in jaws 41 on the end of a guide-holding rod 42 which is mounted for axial movement in bearings in the frame 7. Rigidly secured to shaft 40 is an arm 43 to which is pivotally connected a guide-positioning rod 44 which also extends through a bearing in the frame 7 and is axially movable. Thus by reciprocating the rod 44, spring 29 is rocked on its pivot and the rollers 28, 28' are moved from side to side to guide the wire as it is wound on the form and cause it to wind a plurality of layers of any desired width one on top of another; the speed at which rod 44 is moved may be such that successive turns are wound side by side to form an even regular layer and the extent of the movement of rod 44 determines the width of the several layers. It is sometimes desired to wind a coil of a plurality of layers and have the successive layers increase or decrease in width; this can be accomplished on the machine automatically by varying the throw of the rod 44, that is, by increasing or narrowing the limits between which the rod is reciprocated as the winding progresses. Such a coil is shown in Fig. 14; the width of the first layer of turns is small and in the succeeding layers steadily increases until the last is reached; or the coil may be wound in the reverse order by starting with a layer of the maximum width and decreasing with each succeeding layer. In winding an armature such as that shown in Fig. 13 a coil similar to that shown in Fig. 14 would be used, the particular cross-section of the coil being desired in order that the coils will lie close to the shaft as compactly as possible at the top and bottom of the armature where they cross each other.

Figure 6:
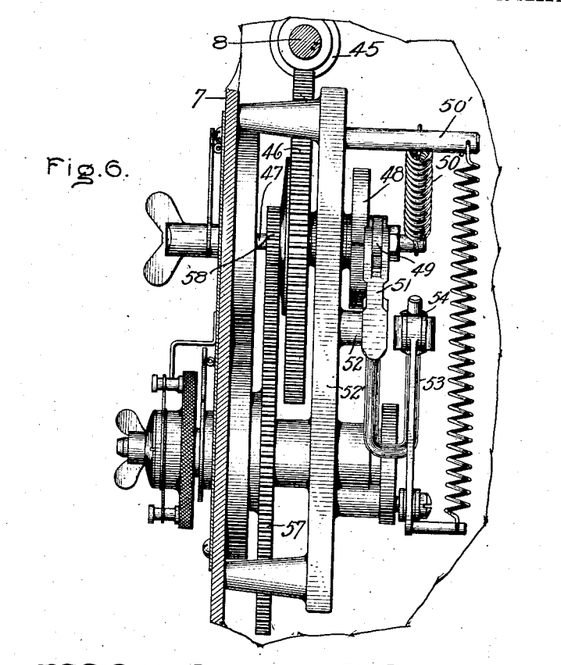
Fig. 6 is a side view of the counting and guide-positioning mechanism.
Figure 8:
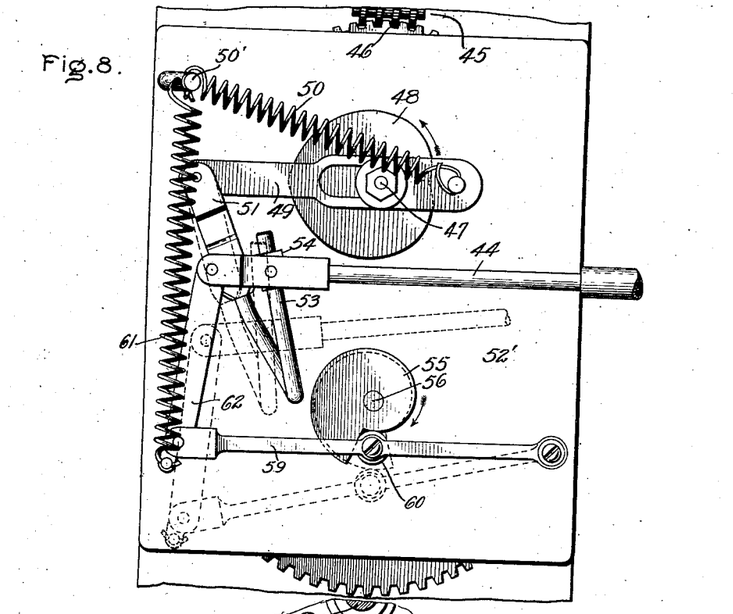
Fig. 8 is a back view of the guide-positioning mechanism.
Figure 9:
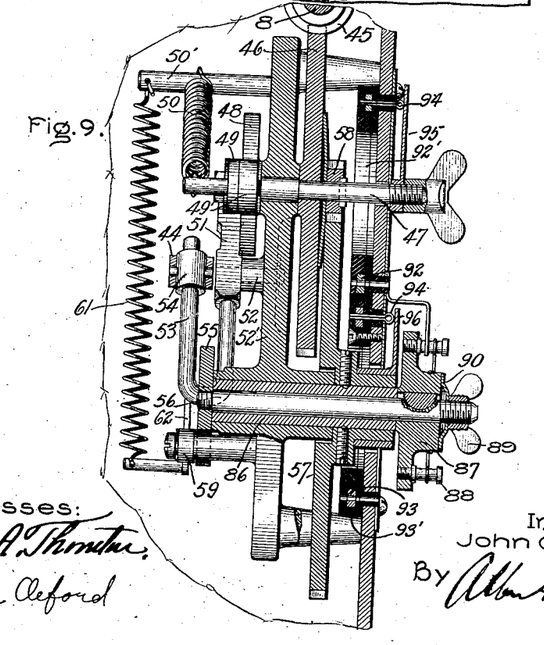
Fig. 9 is a section of the counter and guide-positioning mechanism.

The mechanism for causing the axial reciprocatory movement of rod 44 will now be described. On the shaft 8 and within the frame 7 is a worm 45 (Figs. 6, 8 and 9) with which meshes a worm-wheel 46, mounted on a shaft 47 carrying a cam 48. Coöperating with cam 48 is a lever 49, on the end of which is a roller 49' bearing on the cam surface; a spring 50 having one end secured to lever 49 and the other end to a post 50' holds the roller in engagement with the cam. The end of lever 49 is pivotally connected to a link 51 which is pivoted on a post 52 integral with the plate 52' secured to the face-plate of the machine. The link 51 is provided with a hooked arm 53 on which a sleeve 54 is slidably mounted, and the inner end of rod 44 is pivotally connected to this sleeve. It will thus be seen that as the cam 48 is rotated the link 51 is rocked on its pivot 52 thus reciprocating the rod 44. So long as the position of the sleeve 54 on the hooked end of link 51 remains the same the rod 44 will be moved back and forth between the same limits, and the layers of turns of wire wound by the machine will be of equal width. In order to automatically increase or decrease the width of the several layers, a variable throw mechanism is employed by which the position of sleeve 54 on the hooked end of link 51 is automatically changed so that the reciprocatory movement of rod 44 is steadily increased or decreased. This mechanism consists of a cam 55 mounted on a shaft 56 extending through a sleeve 86 on which is mounted a large gear 57 meshing with a small pinion 58 on the shaft 47 of the worm-wheel 46. Shaft 56 normally turns with sleeve 86 as will be more fully explained hereinafter. Pivotally mounted on the plate 52' is a lever 59 carrying a roller 60 which is held in engagement with the periphery of cam 55 by a spring 61 secured at one end to the end of lever 59, and at the other to post 50'. A link 62 is pivotally connected to the end of lever 59 and to the end of rod 44, so that as cam 55 is rotated the lever 59 is turned on its pivot and operates to move the end of rod 44 up and down on the hooked end 53 of link 51. The leverage of the link 51 on the rod 44 may thus be changed continuously and automatically, effecting a corresponding change in the reciprocatory movement of rod 44.

In some cases in winding armatures for meters of the motor type it is desired to wind a number of layers of wire each consisting of a plurality of turns around a suitable form and close to a central shaft or opening or in a groove in the form and then wind a similar coil in continuation of the first coil and parallel thereto but on the opposite side of the shaft or opening or in another groove. Ordinarily the layers of turns in these coils are of equal width so the variable throw mechanism governed by cam 55 is not used though of course it can be if desired. Some additional mechanism is required however, to move the guide-roller 28' and the supporting member relatively after the first coil is wound to bring the parts to the position necessary for winding the second coil. I accomplish this by moving the rod 42 which carries the guide-rollers 28 and 28'. The guide-holding rod 42 extends through the frame 7 and on the left side of the frame is provided with a slot into which a pin 63 extends to permit axial movement of the rod but prevent turning. Within the frame 7 a coiled spring 64 surrounds the rod, as shown in Fig. 4, and urges the rod in a direction to move the guide-rollers 28, 28' away from the frame. On the end of rod 42 opposite that which carries the guide-rollers is a thumb-nut 65 held in any position to which it is adjusted by a lock-nut 66.

Figure 3:
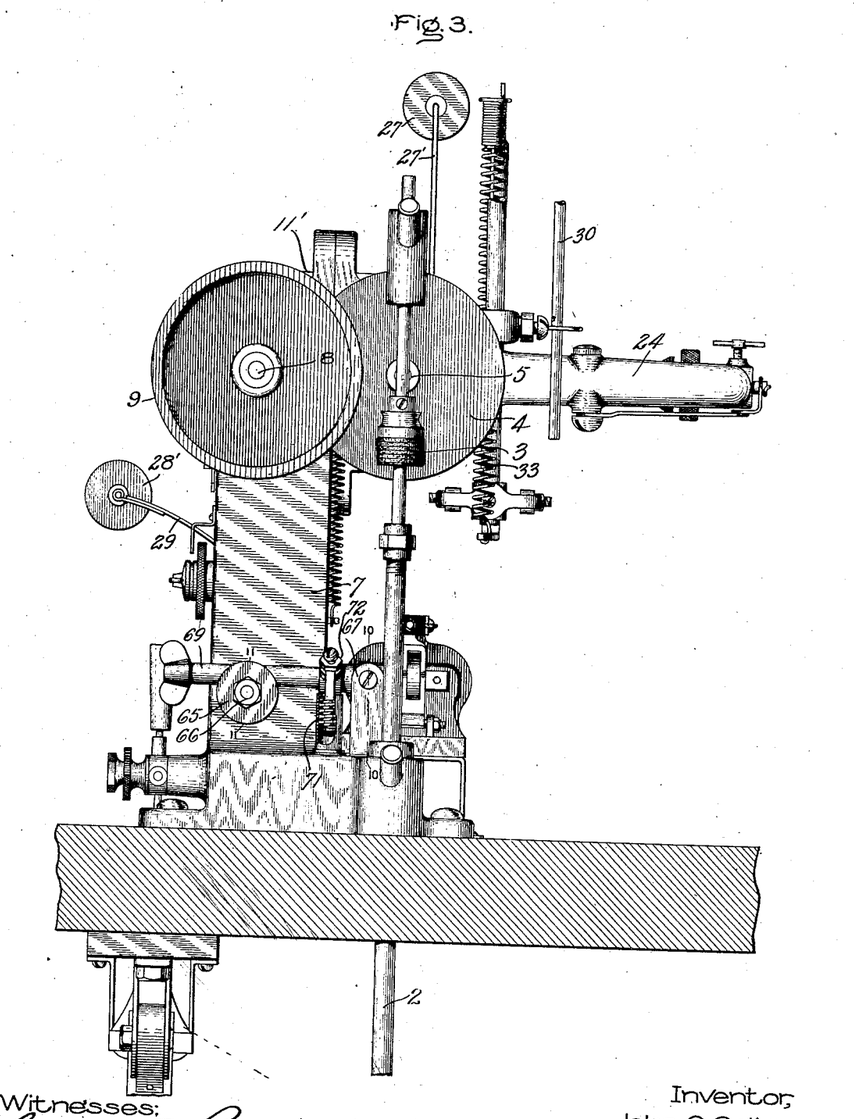
Fig. 3 is a similar view of the other side of the machine.

At the back of the machine are standards 67 (Figs. 3, 4 and 10) in which a sleeve 68 is pivoted and rotatable within this sleeve is a rod 69 which for a portion of its length is cut down to a rectangular cross-section and is adapted to fit between the thumb-nut 65 and a boss 70 on the frame 7 through which the rod 42 extends as shown in Fig. 11. To wind such a pair of parallel coils the operator places the rod 69 between thumb-nut 65 and boss 70 as shown in Figs. 1 and 11 by grasping the nut 65 and pulling it and the rod 42 to which it is secured axially to the right far enough to permit the entrance of the rod 69 between the thumb-nut and boss; when the number of turns desired for the first coil have been wound rod 69 is automatically removed from between nut 65 and boss 70 and spring 64 pushes the guide-holding rod 42 axially to shift the guide roller 28' to the proper position for winding the second coil. The mechanism for accomplishing this is constructed as follows:—A coiled spring 71 (Fig. 3) acts on a plunger which is secured to a projection 72 on the rod 69 in a direction to rotate the rod on its axis in the sleeve 68. On the rear end of rod 69 is a projection 73 (Fig. 4) and pivoted in coöperative relation to this projection is a latch 74 which carries the armature 80 of an electromagnet 81. Thus when circuit is closed through the coils of magnet 81 the magnet is energized, armature 80 is attracted, latch 74 releases projection 73, and spring 71 turns rod 69 on its axis about 90 degrees thereby moving the rod from the position shown in Fig. 11 with its rectangular position between nut 65 and boss 70 to a position in which the longer side of the rectangular portion of rod 69 rests upon the upper surface of the nut 65 and boss 70; as soon as the rod is removed from between nut 65 and boss 70, spring 64 pushes guide-holding rod 44 axially toward the left in Fig. 1 until the opposed faces of nut 65 and boss 70 engage and thus prevent further axial movement of the rod. When the latch 74 is holding the projection 73 an upwardly-extending portion 74' thereon is in engagement with a spring contact 82 mounted on a block of insulating material 83, but when the latch releases projection 73 and magnet 81 is deënergized, a spring 84 pulls the latch forward away from spring contact 82 and into engagement with the head of a screw 85, thus breaking the circuit through contact 82 and establishing a new circuit through contact 85.

Splined to the forward end of the shaft 56 is a disk 87 (Fig. 9) in which are a number of holes (Fig. 7) to receive pins 88. The end of shaft 56 is threaded to receive a hand-nut 89 which may be turned to press a spring washer 90 down upon the disk 87 to force it against the sleeve 86 and thus cause shaft 56 to rotate with sleeve 86. Secured on the face plate of the machine is an arm 91 which is engaged by one of the pins 88 to arrest the disk 87 and thus hold shaft 56 stationary. When this occurs the variable throw mechanism actuated by cam 55 is rendered inoperative and the layers of turns wound by the machine will be of equal width. The pin 88 may be inserted in a hole of the disk 87 in such relation that the variable throw mechanism will operate for a definite portion of the winding operation and will then be rendered inoperative or in a position to render the mechanism inoperative throughout the winding operation. For convenience in operating the machine a second pin 88 may be inserted in one of the holes in disk 87 to limit the backward movement of disk 87 in adjusting the machine when a number of similar coils are to be wound.

Figure 7:
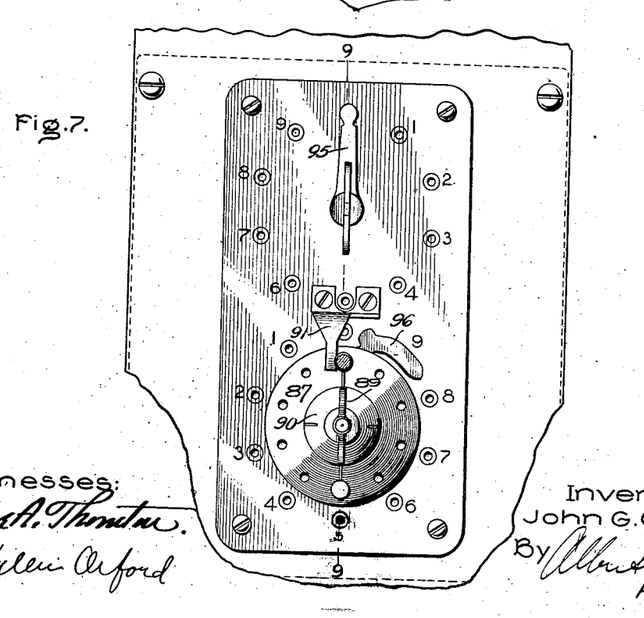
Fig. 7 is a front view of the same.

In order that a definite number of turns may be wound in each coil I provide a counting device arranged so as to stop the winding operation after the desired number of turns have been wound. Secured on the back of the face-plate of the machine are two rings of insulating material 92' and 93' concentric with shafts 47 and 56, respectively, in each of which a ring 92 and 93 respectively of conducting material is embedded. Openings insulated by suitable bushings are provided in the face-plate as shown in Fig. 7 in which metal pins 94 may be inserted to make electrical connection to the conducting rings. On the shaft 47 is a metallic arm 95 adapted to engage a pin in an opening of the upper circle and secured on sleeve 86 is an arm carrying a brush 96 coöperating with the pins in the openings of the lower circle. The gearing upon shaft 47 and sleeve 86 for convenience should have a ratio of reduction of 10 to 1 so that arm 95 would make a complete revolution while brush 96 is making one-tenth of a revolution and there should be ten holes leading to each of the rings 92 and 93 spaced at equal distances apart. In operating the machine a pin is inserted in the hole in the lower ring corresponding to the number of hundreds of turns and a pin in the hole in the upper ring corresponding to the additional number of tens of turns, and the machine is then started. When the desired number of turns have been wound the brush 96 and the arm 95 will be in contact with the two pins as will be readily understood, completing a circuit from ring 92, to arm 95, to the frame of the machine, to brush 96 and to the lower ring 93. This circuit is completed through the coil 78 of the release magnet which as above explained disconnects the drive shaft from the shaft 8.

Figure 15:
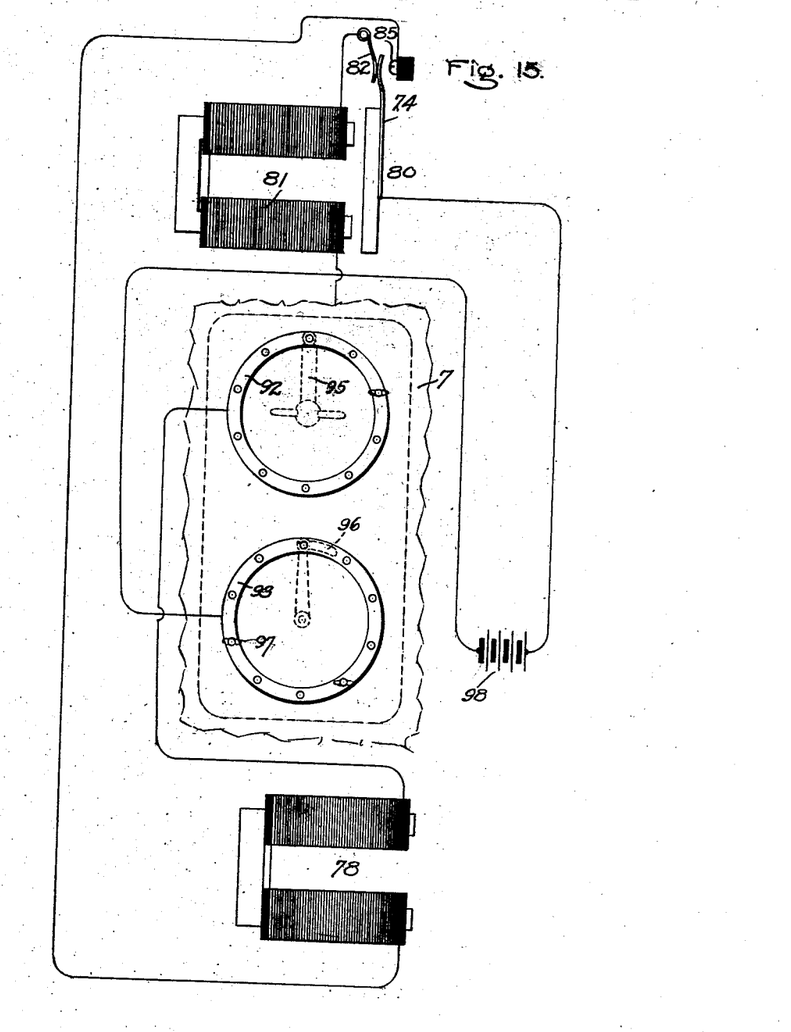
Fig. 15 is a diagram of the circuits.

The operation of the machine as thus constructed will be readily understood. The form on which the coil is to be wound is inserted upon fork 10; a reel of wire is mounted on the shaft 23 and the thumb-nut 25 is screwed up on the reel to hold it tight upon the shaft. The wire from the reel is led up over roller 26, down over roller 27, and over the guide-rollers 28, 28' to the form. Pins are inserted in the rings 92 and 93 in the positions corresponding to the number of turns it is desired to wind on the form. Handle 19 is then moved 90 degrees to the right, thus moving strip 12, shaft 5 and roller 6 forward, and connecting roller 6 in driving relation to shaft 8; the supporting member is thus rotated drawing the wire from the reel 23 and winding it up on the member. As the wire is wound on, cam 48 reciprocates the rod 44 and guide 29 so as to lay the turns on in layers, one on top of another. The width of these layers depends upon the position of the cam 55 which may be moved to any position necessary to give the width desired for the several layers by adjusting the disk 87 and inserting a pin 88 therein in a position to abut against the arm 91 and hold shaft 56 and cam 55 against movement. When operating in this way the spring contact 74' on the latch 74 which carries armature 80 is in contact with the screw 85 (Fig. 15) and when the arm 95 and brush 96, which are driven from shaft 8 through gears 45, 46, 58 and 57, come in contact with the pins in the rings 92 and 93 a circuit is closed from a source of supply 98 to spring 74', contact 85, magnet 78, ring 92, arm 95 to the frame of the machine, to brush 96, ring 93 and back to the source 98. Magnet 78 being energized disconnects the drive shaft 5 from the shaft 8 of the supporting member as above described and the winding operation stops. If it is desired to automatically increase or decrease the width of the layers as the winding progresses, pin 88 is placed in such a position in disk 87 as will allow the proper movement of cam 55. Then as the winding progresses cam 55 is driven from shaft 8 through gears 45, 46, 58, 57, sleeve 86, disk 87, to shaft 56, and cam 55 on shaft 56 moves rod 59 on its pivot and thus shifts the position of the end of rod 44 on the hooked end 53 of link 51. This changes the leverage of lever 51 on rod 44 continuously and automatically so that the width of the layers is continually increased. If the width of the layers is to be decreased automatically, cam 55 may be reversed upon shaft 56. Also, pin 88 may be placed in such a position in disk 87 that the width of the successive layers of turns is increased or decreased during only a portion of the winding operation. If it is desired to wind two coils parallel to each other but laterally displaced and have the second coil a continuation of the first, the rod 69 is placed by hand between the thumb-nut 65 and boss 70 and is held in this position against the tension of spring 71 by the projection 73 catching under latch 74. In doing this, the spring contact 74' on latch 74 is carried away from screw 85 and into engagement with the contact 82. A pin is inserted in one of the holes of the lower ring 93, as for instance at 97, Fig. 15, in a position corresponding to the number of turns which are to be wound in the first coil and pins are also inserted in the upper and lower rings in positions corresponding to the total number of turns which are to be wound on the two coils. The machine is then started as before, a coil is wound on the supporting member, and when the brush 96 engages pin 97 a circuit is completed from the battery 98, or other suitable source of supply of electric energy, to contact 74', contact 82, magnet 81 to the frame of the machine, and then through the brush 96, pin 97 and ring 93 to the opposite terminal of battery 98. Magnet 81 being energized attracts its armature 80 thus releasing projection 73 and permitting spring 71 to turn rod 69 in sleeve 68 and thus withdraw the rectangular portion of the rod from between nut 65 and boss 70 whereupon spring 64 forces the guide-holding rod 42 to the left in Fig. 1, shifting the guide to the position for winding the second coil. When brush 96 moves off of pin 97 this circuit is opened and magnet 81 releases armature 80 which is drawn by spring 84 to a position in which contact 74' is out of engagement with spring arm 82 and in electrical contact with screw 85. The winding of the second coil progresses until brush 96 and arm 95 engage the pins in the lower and upper rings respectively. Circuit is then closed from the battery through the contact 74', contact 85, magnet 78, to the upper ring, then through arm 95 to the frame of the machine, through brush 96 and ring 93 back to the battery 98. Magnet 78 being energized attracts its armature, thus releasing spring 77 and the latter turns shaft 18 and shaft 15 in their bearings thus carrying roller 6 out of engagement with the roller 11.

If for any reason the turns are not laid on properly and it is desired to wind them off and back onto the reel, the handle 19 is turned from the running position a half revolution in the reverse direction. By means of the eccentric pin 20 on the shaft of handle 19 and the arm 16 with which it coöperates, the shaft 15 is turned on its bearings and arm 14 thereon moves spring strip 12 and shaft 5 supported thereon backward, carrying roller 6 away from roller 11 and roller 21 into engagement with wheel 22. The shaft 8 of the supporting member is thus disconnected from the drive shaft and shaft 23 carrying the reel is rotated and draws the wire off.

I wish it understood that the embodiment of my invention which I have illustrated and described herein may be modified in many respects without departing from the spirit of my invention and that I aim to cover all such modifications in the claims appended hereto.

What I claim as new and desire to secure by Letters Patent of the United States, is,—

1. In a winding machine, the combination of a supporting member on which the material is to be wound, a holder for the material to be wound, means for winding the material on said supporting member, and electrically-operated means for automatically discontinuing the winding after a predetermined number of turns have been wound.

2. In a winding machine, the combination of a power shaft, a rotary supporting member on which the material is to be wound, means for connecting the power shaft in driving relation thereto, a holder for the material to be wound, and electrically-operated means for automatically disconnecting the power shaft from said member after the latter has made a predetermined number of revolutions.

3. In a winding machine, the combination of a power shaft, a rotary supporting member on which the material is to be wound, a rotary holder for the material to be wound, means for connecting the power shaft in driving relation to either the supporting member or holder, and means for automatically disconnecting the power shaft from said member after the latter has made a predetermined number of revolutions.

4. In a winding machine, the combination of a power shaft, a rotary supporting member on which the material is to be wound, a rotary holder for the material to be wound, means for connecting the power shaft in driving relation to either the supporting member or holder, and electrically-operated means for automatically disconnecting the power shaft from said member after the latter has made a predetermined number of revolutions.

5. In a winding machine, the combination of a rotary holder for the material to be wound, a braking device operating on the holder, means governing the braking device dependent on the tension of the material, a rotary supporting member on which the material is to be wound, means for driving the same, and electrically-operated means for automatically discontinuing the winding after a predetermined number of turns have been wound.

6. In a winding machine, the combination of a power shaft, a rotary holder for the material to be wound, a braking device operating on the holder, means governing the braking device dependent on the tension of the material, a rotary supporting member on which the material is to be wound, means for connecting the power shaft in driving relation to either the holder or supporting member, and means for automatically disconnecting the power shaft from said supporting member after the latter has made a predetermined number of revolutions.

7. In a winding machine, a power shaft, a shaft arranged to carry the supporting member on which the material is to be wound, a movable support for one of said shafts, and means for moving the movably-supported shaft to connect the power shaft in or disconnect it from driving relation to the other shaft.

8. In a winding machine, the combination of a power shaft, a flexible support therefor, a shaft arranged to carry the supporting member on which the material is to be wound, means for moving the power shaft to connect it in driving relation to said shaft, and means for automatically disconnecting the power shaft therefrom after a predetermined number of turns have been wound.

9. In a winding machine, the combination of a power shaft, a rotary supporting member on which the material is to be wound, means for connecting the power shaft in driving relation to said member, a spring acting to disconnect the power shaft from driving relation to said member, a latch for holding the spring inoperative, and means to release the latch after a predetermined number of turns have been wound.

10. A winding machine having a supporting member on which the material is to be wound, a guide for the material, means for winding a coil on the member, electrically-operated means operated automatically after a predetermined number of turns have been wound for moving the member and guide relatively to wind a second coil on the member in continuation of and spaced apart from the first, and means for automatically discontinuing the winding when a predetermined number of turns have been wound.

11. In a winding machine, the combination of a power shaft, a rotary supporting member on which the material is to be wound, a rotary holder for the material to be wound, means for connecting the power shaft in driving relation to either the supporting member or holder, a guide for the material, and electrically-operated means for automatically shifting the rotary supporting member and guide relatively upon the completion of a coil to bring said guide opposite a different portion of said member to wind a second coil in continuation of and spaced apart from the first.

12. A winding machine having a supporting member on which the material is to be wound, a guide for the material, a movable rod carrying the guide, means tending to force the guide-holding rod in one direction, a latch to hold the rod against movement, and means to release said latch after a coil is wound to permit movement of the guide relatively to said member to wind a second coil in continuation of and spaced apart from the first.

13. A winding machine having a supporting member on which the material is to be wound, a guide for the material, means for rotating the member, means for reciprocating the guide between definite limits to wind a coil in layers, and electrically-operated means for automatically moving the member and guide relatively to wind a second coil on the supporting member in continuation of and spaced apart from the first.

14. A winding machine having, in combination, a supporting member on which the material is to be wound, a guide for the material, means for rotating the member to wind a coil thereon, means for reciprocating the guide between definite limits, means for automatically varying the limits between which the guide is reciprocated, and means for automatically moving the guide and supporting member relatively to wind a second coil on the support in continuation of and spaced apart from the first.

15. In a winding machine, the combination of a supporting member on which the material is to be wound, a guide for the material, means for winding a coil on the member, means for reciprocating the guide between definite limits, means for automatically varying the limits between which the guide is reciprocated, and means for automatically discontinuing the winding after the supporting member has made a predetermined number of revolutions.

16. In a winding machine, the combination of a power shaft, a rotary supporting member on which the material is to be wound, a rotary holder for the material to be wound, means for connecting the power shaft in driving relation to either the supporting member or holder, a guide for the material, means for reciprocating the guide, and means for automatically varying the limits between which the guide is reciprocated.

17. A winding machine having a member on which the coil is to be wound, a guide for the material to form the coil, means for winding a coil on the member, means for automatically reciprocating the guide during the winding operation, and means for automatically varying the limits between which the guide is reciprocated for a controllable portion of the winding operation.

18. A winding machine having a member on which the material is to be wound, a guide for the material, means for rotating the member to wind a coil thereon, two cams rotated when said member is rotated, a guide-positioning rod connected to the guide, means whereby one cam reciprocates said rod, and means whereby the second cam varies the leverage of the first cam on said guide-positioning rod.

19. A winding machine having a member on which the material is to be wound, a guide for the material, means for rotating the member to wind a coil thereon, two cams rotated when said member is rotated, a guide-positioning rod connected to the guide, means whereby one cam reciprocates said rod, means whereby the second cam varies the leverage of the first cam on said guide-positioning rod, and means for rendering the second cam inoperative.

20. In a winding machine, the combination of a shaft, a member carried thereby on which the material is to be wound, means for driving the shaft, two shafts geared to said shaft, a brush carried by each of said shafts, adjustable contacts in the path of movement of said brushes, means whereby a circuit is closed when both said brushes are in engagement with said contacts, and means operated when said circuit is closed to stop the rotation of the shaft carrying said member.

21. In a winding machine, the combination of a shaft, a member carried thereby on which the material is to be wound, means for driving the shaft, a guide for the material, a shaft geared to said shaft, a brush carried thereby, an adjustable contact in the path of movement of said brush, means whereby a circuit is closed when the brush engages the contact, and means operated when the circuit is closed to move said guide and member relatively.

22. In a winding machine, the combination of a shaft, a member carried thereby on which the material is to be wound, two electrical contact devices mechanically connected to said shaft and driven at different speeds, and means controlled by the joint action of said devices for stopping said shaft.

23. In a winding machine, the combination of a shaft, a member carried thereby on which the material is to be wound, two electrical contact devices mechanically connected to said shaft and driven at different speeds, means controlled by the joint action of said devices for stopping said shaft, and means for adjusting the operation of said contact devices.

In witness whereof, I have hereunto set my hand this seventeenth day of January 1905.

JOHN G. CALLAN.

Witnesses:
JOHN A. McMANUS, Jr.,
DUGALD McKILLOP.